United States Patent [19]

Michalczyk

[11] Patent Number: 5,300,614

[45] Date of Patent: Apr. 5, 1994

[54] SILICON CARBIDE PRECURSORS

[75] Inventor: Michael J. Michalczyk, Wilmington, Del.

[73] Assignee: E. I. Du Pont de Nemours and Company, Wilmington, Del.

[21] Appl. No.: 994,867

[22] Filed: Dec. 22, 1992

Related U.S. Application Data

[60] Division of Ser. No. 751,520, Aug. 29, 1991, Pat. No. 5,202,405, which is a continuation-in-part of Ser. No. 573,419, Aug. 27, 1990, abandoned.

[51] Int. Cl.$^5$ .............................................. C08G 77/24
[52] U.S. Cl. ...................................... 528/42; 528/10; 525/475; 556/431; 556/466
[58] Field of Search .................. 525/475; 528/42, 10; 556/431, 466

[56] References Cited

U.S. PATENT DOCUMENTS

| | | | |
|---|---|---|---|
| 4,472,591 | 9/1984 | Schilling, Jr. et al. | 556/430 |
| 4,631,179 | 12/1986 | Smith, Jr. | 423/345 |
| 4,761,458 | 8/1988 | Burns et al. | 525/474 |
| 5,004,610 | 4/1991 | Osborne et al. | 424/448 |
| 5,202,405 | 4/1993 | Michalczyk | 528/42 |

FOREIGN PATENT DOCUMENTS 139257 5/1985 European Pat. Off. ...... C08G 77/60

OTHER PUBLICATIONS

S. Yajima, Am. Ceram. Soc. Bul., 62, 893 (1983).
C. L. Schilling, Jr. et al., Am. Ceram. Soc. Bul., 61, 912 (1983).
C. L. Czekaj et al., J. Am. Ceram. Soc., 73, 353 (1990).
D. J. Carlsson et al., J. Am. Ceram. Soc., 73, 237 (1990).
Whitmarsh et al., Organometallics 10, 1336-1344 (1991).

Primary Examiner—Melvyn I. Marquis

[57] ABSTRACT

Chloromethyltrichlorosilane is converted to polychlorocarbosilane and in turn to a polycarbosilane polymer that has utility as a precursor to silicon carbide ceramics.

13 Claims, No Drawings

SILICON CARBIDE PRECURSORS

This application is a division of application Ser. No. 07/751,520 filed Aug. 29, 1991, now U.S. Pat. No. 5,202,405, which is a continuation-in-part of U.S. Ser. No. 07/573,419 filed Aug. 27, 1990, abandoned.

FIELD OF THE INVENTION

This invention concerns novel polychlorocarbosilane and polycarbosilane polymers derived from chloromethyltrichlorosilane that function as precursors to silicon carbide ceramics.

BACKGROUND OF THE INVENTION

New precursors for ceramic fibers that lead to pure silicon carbide, SiC, and do not thermally degrade, or do not need oxygen curing are of great commercial interest.

The most commonly used polycarbosilane precursor to silicon carbide ceramics is "Nicalon", manufactured by the Nippon Carbon Company. (S. Yajima, Am. Ceram. Soc. Bul., 62,893 (1983)). "Nicalon" is based on polydimethylsilane $[Si(CH_3)2]_n$, a polymer which has a silicon to carbon ratio (Si:C) of 1:2. In order to manufacture ceramic fibers from a ceramic precursor, it must retain its shape during firing. To accomplish this with "Nicalon", firing must be carried out in the presence of oxygen which stabilizes the "Nicalon" preceramic. This leads to an undesirably high level of oxygen in the final ceramic resulting in poor resistance to thermal degradation in use. As expected, an analysis of the ceramic fiber showed both a carbon-rich state and a high level of oxygen. The composition corresponded to: $SiC + 0.78 C + 0.22 SiO_2$. As a further disadvantage, "Nicalon" undergoes an undesirably large 30–40% weight loss during pyrolysis to the ceramic.

There are a variety of other polysilane and polycarbosilane polymers which yield non-stoichiometric SiC with significant weight loss.

European Patent Application No 139257, (U.S. Ser. No. 537,672) discloses the synthesis of a polycarbosilane that yields silicon carbide after pyrolysis at 1200° C. with a weight loss of 42%.

Schilling et al., Am. Ceram. Soc. Bul., 62, 912 (1983), report the synthesis of a number of polycarbosilanes which produce silicon carbide with a significant weight loss after firing.

C.L. Czekaj et al., J. Am. Ceram. Soc., 73, 352 (1990), report the reaction of $Cl_2CH_3SiCH_2Cl$ with magnesium followed by lithium aluminum hydride reduction to yield a polycarbosilane with a Si:C ratio of 1:2.

It is an object of the present invention to provide a polycarbosilane ceramic precursor that gives a minimum weight loss during firing. It is a further object of the present invention to provide a novel polycarbosilane that has a Si:C ratio of essentially 1:1. It is a further object of the present invention to provide a water stable. It is a further object of the present invention to provide a novel polycarbosilane with which there is no need to add oxygen to retain the shape of pulled fibers during firing.

SUMMARY OF THE INVENTION

In one aspect this invention concerns the novel polychlorocarbosilane made by reacting chloromethyltrichlorosilane with magnesium in a non cyclic aliphatic ether at temperatures from 20° C. to reflux of the non cyclic aliphatic ether. Another aspect concerns the novel polychlorocarbosilane made by reacting chloromethyltrichlorosilane with magnesium in a cyclic aliphatic ether excluding 1,4-dioxane at temperatures from 20° C. to 40° C.

This invention further concerns a process for the preparation of such novel polychlorocarbosilanes which comprises the reaction of chloromethyltrichlorosilane with magnesium.

This invention further concerns the novel polycarbosilane of the empirical formula "$[H_2SiCH_2]_n$" made from the polychlorocarbosilane and the pyrolysis of the polycarbosilane in the absence of oxygen to produce siliconoxycarbide.

With regard to their higher green strength and shape retention during firing, preferred siliconoxycarbides, are those derived from polychlorocarbosilanes made in diethyl ether. With regard to air curability, preferred siliconoxycarbides are those derived from tetrahydrofuran.

DETAILED DESCRIPTION

The reaction of chloromethyltrichlorosilane, $Cl_3SiCH_2Cl$, with magnesium in ethereal solvents at temperatures of from room temperature (20°–25° C.) to reflux temperatures produces soluble polymer. Proper selection of reaction temperatures results in none of the ethereal solvent entering into the reaction and, as a result, entering into the polymer structure. Suitable ethereal reaction solvents are non cyclic aliphatic ethers including, but not limited to, diethyl ether, dipropyl ether, dibutyl ether, and such diethers as 1,2-dimethoxyethane and triethers such as 2-methoxyethyl ether (diglyme). For these non cyclic aliphatic ethers suitable reaction temperatures are from room temperature (20°–25° C.) up to the reflux temperature for the selected non cyclic aliphatic ether. Cyclic aliphatic ethers including, but not limited to, tetrahydrofuran (THF), 2-methyltetrahydrofuran, 2,5-dimethyltetrahydrofuran, and tetrahydropyran, but not including 1,4-dioxane which under the reaction conditions does not form a Grignard reagent (possibly due to a precipitation of a Grignard reagent-1,4-dioxane complex), may also be employed as reaction solvents. For these cyclic aliphatic ethers, reaction temperatures of from 20°–40° C. are generally used, with room temperature (20°–25° C.) as the preferred reaction temperature. Temperatures higher than 40° C. are less suitable. Analysis of the isolated polymer has shown that at reflux, with THF as solvent, some THF does enter into the reaction and is incorporated into the polymeric product.

Magnesium employed in the reaction may be standard reagent quality or "activated". Normally from one half to two moles of magnesium per mole of silane are employed.

The polychlorocarbosilane polymer produced is of the formula $[Cl_2SiCH_2]_n$ where n=3–11.

The order of the addition, either silane to magnesium suspended in an ethereal solvent or the reverse, is not critical. In the case of magnesium added to silane, the addition is usually carried out over about 2 hours, but this time is not critical. Magnesium addition is followed by a 2 hour reaction period at elevated temperatures — the reflux point of a non cyclic aliphatic ether media is convenient — followed by, optionally, stirring at ambient temperature for from 10 to 20 hours. In the case of cyclic aliphatic ethers, 2 hour reaction at room temperature is convenient.

After polychlorocarbosilane formation, reduction with lithium aluminum hydride (LAH), or other suitable reduction agent such as, but not limited to, lithium hydride or alkyl aluminum hydrides, is most conveniently carried out in the same reaction vessel. Reduction agent is usually employed in excess (from stoichiometric amount to 10% excess is customary). Reduction temperature is usually from about $-10°$ C. to about room temperature ($20°-25°$ C.). The preferred temperature is about $0°$ C. Should the reduction reaction mass thicken, the reaction mass may be thinned by the addition of an inert diluent such as hexane or additional ethereal solvent. After workup of the reduction mass, the proton NMR of the resulting polycarbosilane shows $SiH_3$ (38-57%), $SiH_2$ (28-43%) and SiH (7-19%) resonances, indicative of a high degree of branching. Most of the reactions carried out show $SiH_3$ on the high end (48-53%). The richness in terminal $SiH_3$ groups is confirmed in the $^{29}Si$ NMR spectrum. Also observed are $SiCH_2$/ total SiH ratios from 1.2-2.7 indicating some oxidation of the polycarbosilane. The final polymer ranges from a white semi-brittle solid to a viscous oil depending on the solvent and temperature of the reaction. The solid polymer becomes insoluble with time, once the solvent is removed. Isolated yields range from 15-88% based on chloromethyltrichlorosilane.

Heating the polycarbosilanes results in the formation of siliconoxycarbide ceramics.

The polycarbosilanes produced in diethyl ether gave TGA yields of 81-93% at $950°$ C. with the solid polycarbosilane polymers giving TGA yields above 88%; those produced in THF gave TGA yields of 40-63%. These yields are based on the weight of precursor polycarbosilane. These high ceramic yields are surprising, and thought to be due to the fact that the polycarbosilanes are crosslinked with oxygen via Si—O—Si linkages. The conversion to siliconoxycarbide with a weight loss of 7-12%, or a ceramic yield (defined as: wt. SiC/wt. polycarbosilane $\times 100$ or as 100% minus weight loss percent) of 88-93% is unique in that most polymer precursors to SiC do not have high ceramic yields ("Nicalon's" yield is about 65%). Few polycarbosilane polymers have such high ceramic yields, and those that do tend to have aryl or acetylene groups incorporated in the polymer.

Upon exposure of the polycarbosilane to air and water one obtains "$[H_{2-x}SiCH_2O_y]_m$" where y is between X/2 and X.

Pyrolysis of the polycarbosilane derived from diethyl ether at $1000°$ C. to $1300°$ C. yields shiny to dull black ceramic materials in 70-85% yield. Retention of the shape of pieces of polymer in the final black material is observed, which is an advantage over previously described materials.

The following pyrolysis conditions can be employed. For pyrolysis at $1000°$ C., increase temperature from room to $250°$ C. at $5°$/min, hold at $250°$ C. for 1 hour, heat to $1000°$ C. at $5°$/min, hold for 1 hour and then cool to room temperature at $5°$/min rate. For pyrolysis at $1300°$ C., increase temperature from room to $1320°$ C. at $10°$/min, hold for 1 hour and cool to room temperature at $10°$/min.

The polycarbosilane ceramic precursors obtained from the LAH reduction have a Si:C ratio of essentially 1:1. Thus, ceramics prepared from this ceramic precursor do not have large amounts of excess carbon as found, for example, in silicon carbide ceramics prepared from "Nicalon".

The polycarbosilane ceramic precursors of the present invention are dimensionally stable during firing without the addition of oxygen to the firing atmosphere as is necessary with "Nicalon" or the precursors described in EPA 537,672. Thus, the polymeric ceramic precursor can be used as a ceramic binder without the need of a curing step. This allows important low temperature processing advantages over "Nicalon". Fibers of the polycarbosilane of the present invention can be pulled from a concentrated hexane solution. Thus this polymer can be spin-cast to SiCO fibers. The polycarbosilane derived from diethyl ether can be mixed with silicon carbide powder in the ratio 20% polycarbosilane: 80% powder yielding fibers. These fibers have a higher green strength than ones derived from "Nicalon" using the same system.

The polycarbosilane derived from THF changes from a viscous oil to a glassy solid upon exposure to air. At room temperature this transformation usually takes place in about one week, however, this process can be accelerated by heating to $100°$ C. This novel air-curability can be used to fashion customized moldings, either at room temperature or between room temperature and $950°$ C., alone or by mixing the appropriate amount of filler such as graphite or silica.

The utility of this novel polycarbosilane is as a high-yield ceramic precursor that does not need to be stabilized or "cured" to retain shape during the conversion to ceramic. The polycarbosilane can be either spin-cast into fibers which would yield siliconoxycarbide with little weight loss upon firing, or be used as a binder to be mixed with powdered SiC or fillers (such as graphite) and cast into fibers or molded into other shapes.

The invention will be illustrated by the following Examples. Reactions were carried out in dried equipment under an argon atmosphere. Chloromethyltrichlorosilane was obtained from Petrarch Systems/Huls America. Diethyl ether was anhydrous reagent grade and purified by distillation from sodium/benzophenone before use. Tetrahydrofuran was spectrophotometric grade (EM Science) and purified by distillation from sodium/benzophenone before use. The magnesium employed was obtained from Aldrich —"99.5% activated chips". Hexane was spectrophotometric grade from EM Science. Lithium aluminum hydride was "95+%" from Aldrich. Proton NMR spectra were determined in deuterochloroform solvent on a GE model QE-300 instrument. Silicon-29 NMR were determined in deuterochloroform solvent on a GE model omega 300 instrument. Thermogravimetric analyses were performed on a DuPont Model 951 analyzer.

EXAMPLES

EXAMPLE 1

Preparation of Polychlorocarbosilane

To a stirred mixture of 20.4 mL (0.162 mol) of $Cl_3SiCH_2Cl$ in 150 mL of diethyl ether was added 4.21 g (0.173 mol) of activated magnesium pellets over a 2 hour period. During the addition the temperature rose to reflux the solvent, and the mixture turned dark brown followed by precipitation of white $MgCl_2$. After the addition the mixture was allowed to continue to reflux for another 2 hours and then was cooled to room temperature and stirred for 16 hours. Hexane (100 mL) was added to the thick white slurry to facilitate stirring.

EXAMPLE 2

Preparation of Polychlorocarbosilane

To a stirred mixture of 4.051 g (0.167 mol) of activated Mg in 150 ml of THF was added 20.2 ml (0.161 mol) of Cl$_3$SiCH$_2$Cl dropwise over a 2 hour period. The temperature of the reaction was kept at or near room temperature. Formation of the brown Grignard reagent was immediate and precipitated salts appeared after about 1 hour. An additional 50 ml of THF was added to the mixture, and the reaction was stirred overnight.

EXAMPLE 3

Preparation of Polycarbosilane

The mixture obtained in Example 1 was cooled to 0° C. and 3.29 g (0.0866 mol) of lithium aluminum hydride was added slowly. After stirring about 15 min, the slurry was slowly quenched with distilled water until the evolution of gas ceased. The bulk of the solids were filtered and the filtrate was extracted with hexane, washed with distilled water and dried over magnesium sulfate. Removal of the volatiles in vacuo left 3.68 g (51.3%) of a thick white polymer. Most of the polymer was redissolved in hexane and toluene leaving some insoluble white solid. Removal of the hexane or toluene solvent left a flexible white solid polymer which became insoluble with time. Proton NMR showed the presence of SiH$_3$ (53%), SiH$_2$ (32%) and SiH (16%) which were confirmed by the silicon-29 NMR. The ratio of total CH protons: SiH protons was 2.0 indicating some Si-Si coupling. TGA analysis (25°-950° C. at 10°/min) gave a ceramic yield of 89%.

EXAMPLE 4

Preparation of Polycarbosilane

The mixture obtained in Example 2 was cooled to 0° C. and 3.37 g (0.0888 mol) of lithium aluminum hydride was added slowly. After stirring for 30 minutes, the mixture was slowly quenched at 0° C. with distilled water, and the polymer was extracted into hexane and washed with either 10% hydrochloric acid solution or distilled water. Both produced similar polycarbosilane. Removal of solvent in vacuo yielded 3.10 g (43.7%) of a thick golden oil which solidified upon exposure to air for approximately one week. Proton NMR showed the presence of SiH$_3$ (56%), SiH$_2$ (35%) and SiH (9%) which were confirmed by silicon-29 NMR. The infrared spectrum showed Si—O—Si at 1050 (br). TGA analysis (25°-950° C. at 10°/min) gave a ceramic yield of 51%. Using non-aqueous workup conditions, a yellow oil is obtained with similar SiH percentages. TGA analysis under the same conditions gave a ceramic yield of 8.6%.

EXAMPLE 5

Preparation of Silicon Carbide

Pyrolysis of the flexible white solid polymer obtained from Example 3 under argon to 1000° C. gave a shiny-black ceramic with a yield of 78% which analyzed as SiC+0.53 Si+0.97 O. Pyrolysis of similar polymers to 1000° C. gave ceramics in 74-85% yield. Pyrolysis of similar polymers to 1300° C. gave ceramics in 71-76% yield. Drawn fibers of the ceramic precursors retained their shape during firing in an argon atmosphere with the exclusion of oxygen. Pyrolysis of the viscous polymer obtained from Example 4 under argon to 1000° C. gave a shiny-black ceramic with a yield of 51%. Pyrolysis of similar polymers to 1000° C. gave ceramics in 40-63%.

What is claimed is:

1. A process for making polycarbosilane comprising reacting chloromethyltrichlorosilane with magnesium in a non cyclic aliphatic ether at temperatures from 20° C. to reflux of said non cyclic aliphatic ether and reacting the polychlorocarbosilane with a reduction agent at −10° C. to 25° C.

2. A process of claim 1 wherein said non cyclic aliphatic ether is diethyl ether.

3. A process for making polycarbosilane comprising reacting chloromethyltrichlorosilane with magnesium in a cyclic aliphatic ether, excluding 1,4-dioxane, at temperatures from 20° C. to 40° C. and reacting the polychlorocarbosilane with a reduction agent at −10° C. to 25° C.

4. A process of claim 3 wherein said cyclic aliphatic ether is tetrahydrofuran.

5. A polycarbosilane prepared by a process comprising:
   (a) reacting chloromethyltrichlorosilane with magnesium in a non cyclic aliphatic ether at temperatures from 20° C. to reflux of the non cyclic aliphatic ether to produce a polychlorocarbosilane; and
   (b) reacting the polychlorocarbosilane with a reduction agent at from bout −10° C. to about 25° C.

6. The polycarbosilane of claim 5 wherein the non cyclic aliphatic either is diethyl ether.

7. A polycarbosilane prepared by a process comprising:
   (a) reacting chloromethyltrichlorosilane with magnesium in a cyclic aliphatic ether, excluding 1,4-dioxane, at temperatures from 20° C. to 40° C. to produce a polychlorocarbosilane; and
   (b) reacting the polychlorocarbosilane with a reduction agent at from about −10° C. to about 25° C.

8. The polycarbosilane of claim 7 wherein the cyclic aliphatic ether is tetrahydrofuran.

9. A polycarbosilane of claim 5 or 7 which exhibits in its NMR spectrum 38-57% SiH$_3$ groups, 28-43% SiH$_2$ groups, and 7-19% SiH groups.

10. A polycarbosilane of claim 5 which cures at room temperature, with or without the need of oxygen, allowing retention of shape upon firing to 1000° C.

11. A polycarbosilane of claim 7 which slowly air cures at temperatures 20° C. or above which can be used in molding applications.

12. The polycarbosilane of claim 5 or 7 wherein the reaction with the reduction agent is carried out at about 0° C.

13. The polycarbosilane of the formula [H$_2$SiCH$_2$]n wherein n is 3 to 11.

* * * * *